United States Patent
Wang et al.

(10) Patent No.: US 10,558,067 B2
(45) Date of Patent: Feb. 11, 2020

(54) SUPPORT FRAME, DISPLAY DEVICE AND MOUNTING METHOD THEREOF

(71) Applicants: BOE Technology Group Co., Ltd., Beijing (CN); Beijing BOE Optoelectronics Technology Co., Ltd., Beijing (CN)

(72) Inventors: Chenru Wang, Beijing (CN); Haiwei Sun, Beijing (CN); Yeong Ho Jeon, Beijing (CN); Ruijun Dong, Beijing (CN); Guangquan Wang, Beijing (CN); Yuefeng Su, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 184 days.

(21) Appl. No.: 15/525,792

(22) PCT Filed: Sep. 23, 2016

(86) PCT No.: PCT/CN2016/099920
§ 371 (c)(1),
(2) Date: May 10, 2017

(87) PCT Pub. No.: WO2017/118107
PCT Pub. Date: Jul. 13, 2017

(65) Prior Publication Data
US 2018/0074359 A1  Mar. 15, 2018

(30) Foreign Application Priority Data

Jan. 6, 2016 (CN) .......................... 2016 1 0009042

(51) Int. Cl.
G02F 1/1333 (2006.01)
F21V 8/00 (2006.01)
G02F 1/1335 (2006.01)

(52) U.S. Cl.
CPC ..... *G02F 1/133308* (2013.01); *G02B 6/0051* (2013.01); *G02B 6/0053* (2013.01);
(Continued)

(58) Field of Classification Search
USPC ....................................... 362/607
See application file for complete search history.

(56) References Cited

U.S. PATENT DOCUMENTS 6,301,100 B1 * 10/2001 Iwata .................... G06F 1/1616
345/169

FOREIGN PATENT DOCUMENTS

CN  101620339 A  1/2010
CN  104765179 A  7/2015
(Continued)

OTHER PUBLICATIONS

Dec. 27, 2016—(WO) International Search Report and Written Opinion Appn PCT/CN2016/099920 with English Tran.
(Continued)

*Primary Examiner* — Elmito Breval
(74) *Attorney, Agent, or Firm* — Banner & Witcoff, Ltd.

(57) ABSTRACT

A support frame, a display device and mounting method thereof. The support frame includes a main body and a protrusion disposed at a side of the main body; the main body includes a first portion located on the protrusion and a second portion located under the protrusion, a thickness of the first portion is at least equal to a thickness of a touch cover plate; a thickness of the second portion is at least equal to a thickness of a backlight module; and a thickness of the protrusion is at least equal to a thickness of a display panel.

14 Claims, 3 Drawing Sheets

(52) U.S. Cl.
CPC ......... *G02B 6/0055* (2013.01); *G02B 6/0088* (2013.01); *G02F 1/13338* (2013.01); *G02F 1/133512* (2013.01); *G02F 2001/133317* (2013.01); *G02F 2001/133325* (2013.01); *G02F 2001/133331* (2013.01); *G02F 2201/46* (2013.01); *G02F 2202/28* (2013.01)

(56) References Cited

FOREIGN PATENT DOCUMENTS

| | | |
|---|---|---|
| CN | 105093635 A | 11/2015 |
| CN | 105467678 A | 4/2016 |
| WO | 2014175172 A1 | 10/2014 |

OTHER PUBLICATIONS

Apr. 25, 2017—(CN) First Office Action Appn 201610009042.0 with English Tran.
Sep. 15, 2017—(CN) Second Office Action Appn 201610009042.0 with English Tran.

\* cited by examiner

SUPPORT FRAME, DISPLAY DEVICE AND MOUNTING METHOD THEREOF

The application is a U.S. National Phase Entry of International Application No. PCT/CN2016/099920 filed on Sep. 23, 2016, designating the United States of America and claiming priority to Chinese Patent Application No. 201610009042.0, filed on Jan. 6, 2016. The present application claims priority to and the benefit of the above-identified applications and the above-identified applications are incorporated by reference herein in their entirety.

TECHNICAL FIELD

Embodiments of the present disclosure provide a support frame, a display device and a mounting method thereof.

BACKGROUND

With the development of liquid crystal display technology, users put forward higher and higher requirements on performance and user experience of products, a significant aspect of which is narrow frame. Narrow frame can effectively increase the display area, thus upon watching and experiencing, the view field of a user becomes relatively wide; and the narrow frame also reduces the width of a cellphone having a large-sized screen, which is convenient for solving the problem of holding and operation by using one hand.

Generally, a narrow frame cellphone refers to such a cellphone in which a distance between an effective display area of a liquid crystal display screen and the periphery edge of the cellphone. In a current cellphone assembly, a cellphone middle frame, a backlight module and a liquid crystal display screen are separated; the backlight module comprises a backlight module and an rubber frame, and the rubber frame is disposed in the cellphone middle frame and used to support the backlight module. However, this kind of design is not convenient for the frame narrowing of a display device.

SUMMARY

Embodiments of the present disclosure provide a support frame, a display device, and a mounting method thereof. In the support frame, an end portion of a backlight module can be placed under a protrusion, so as to avoid separately disposing a rubber frame to support the backlight module, which is convenient for the frame narrowing of a display device.

An embodiment of the present disclosure provides a support frame, the support frame comprises: a main body and a protrusion disposed at a side of the main body; the main body comprises a first portion located on the protrusion and a second portion located under the protrusion, a thickness of the first portion is at least equal to a thickness of a touch cover plate; a thickness of the second portion is at least equal to a thickness of a backlight module, a thickness of the protrusion is at least equal to a thickness of a display panel.

In the support frame provided by an embodiment of the present disclosure, the thickness of the second portion is larger than that of the first portion.

In the support frame provided by an embodiment of the present disclosure, a width of the second portion is larger than that of the first portion.

An embodiment of the present disclosure further provide a display device, the display device comprises: the above-mentioned support frame; a touch cover plate, wherein an end portion of the touch cover plate is disposed on the protrusion and opposite to the first portion of the main body; a backlight module, wherein an end portion of the backlight module is disposed under the protrusion and opposite to the second portion of the main body; and a display panel disposed at a side of the protrusion away from the main body.

In the display device provided by an embodiment of the present disclosure, the backlight module is fixed on a lower surface of the protrusion through light shielding adhesive.

In the display device provided by an embodiment of the present disclosure, the touch cover plate is fixed on an upper surface of the protrusion through light shielding adhesive.

In the display device provided by an embodiment of the present disclosure, the backlight module comprises a light guide plate and an optical film layer disposed on the light guide plate.

In the display device provided by an embodiment of the present disclosure, the optical film layer comprises a first prism sheet, a second prism sheet, and a diffusion film.

In the display device provided by an embodiment of the present disclosure, the display panel and the touch cover plate are connected together through optical transparent adhesive.

In the display device provided by an embodiment of the present disclosure, the backlight module and the display panel are connected together through optical transparent adhesive.

The display device provided by an embodiment of the present disclosure further comprises a support plate, wherein the support plate is fixed on a lower surface of the main body, the backlight module is disposed on the support plate.

In the display device provided by an embodiment of the present disclosure, the support plate is bonded on a lower surface of the main body.

In the display device provided by an embodiment of the present disclosure, the support plate is fixed on a lower surface of the main body through a screw.

In the display device provided by an embodiment of the present disclosure, a surface of the support plate facing the backlight module is a reflective surface.

In the display device provided by an embodiment of the present disclosure, an end surface of the backlight module is flush with an end surface of the touch cover plate.

An embodiment of the present disclosure further provides a mounting method of a display device, comprising: providing a touch cover plate, a display panel, a backlight module and the abovementioned support frame; connecting the touch cover plate and the display panel together; fixing an end portion of the touch cover plate on an upper surface of the protrusion of the support frame; and fixing an end portion of the backlight module on a lower surface of the protrusion of the support frame, wherein the end portion of the touch cover plate is extended outside a region corresponding to the display panel.

In the mounting method provided by an embodiment of the present disclosure, an end surface of the backlight module is flush with an end surface of the touch cover plate.

BRIEF DESCRIPTION OF THE DRAWINGS

In order to clearly illustrate the technical solution of the embodiments of the disclosure, the drawings of the embodiments will be briefly described in the following; it is obvious

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the present disclosure.

Figure 1:
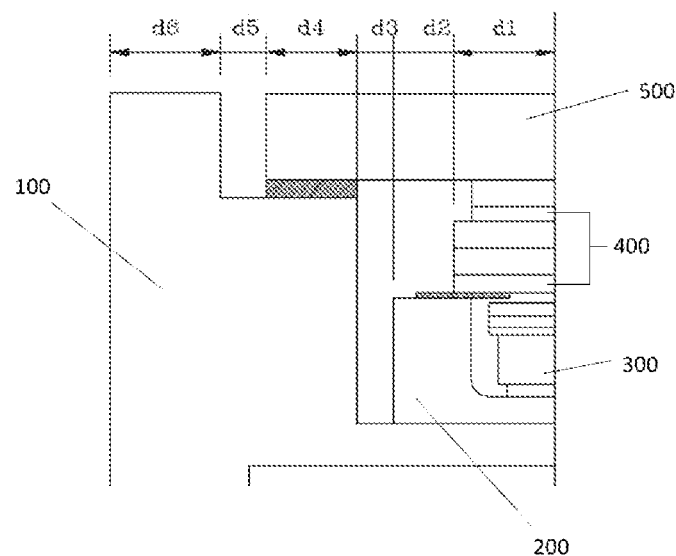
FIG. 1 is a structural schematic diagram of a frame of a display device.

Referring to FIG. 1, which is a structural schematic diagram of a frame of a display device, the display device comprises: a middle frame 100, a rubber frame 200, a backlight module 300, a display panel 400 and a touch cover plate 500. The rubber frame 200 is disposed inside the middle frame 100 and used to support the backlight module 300 and the display panel 400; the middle frame 100 is used to support the touch cover plate 500; d1 is a distance from a display region of the display panel 400 to an edge of the display panel 400, d2 is a distance from the display panel 400 to an edge of the rubber frame 200, d3 is a distance from the rubber frame 200 to the middle frame 100 (for example, d3 is a shortest distance), d4 is a bonding width of the touch cover plate 500 and the middle frame 100, d5 is a distance from the touch cover plate 500 to the middle frame 100 (for example, d5 is a shortest distance), and d6 is a thickness of an upper portion of the middle frame 100.

As illustrated by FIG. 1, a width of the frame (i.e., a width of a non-display region) is d1+d2+d3+d4+d5+d6, and the width of the frame is relatively large.

Figure 2:
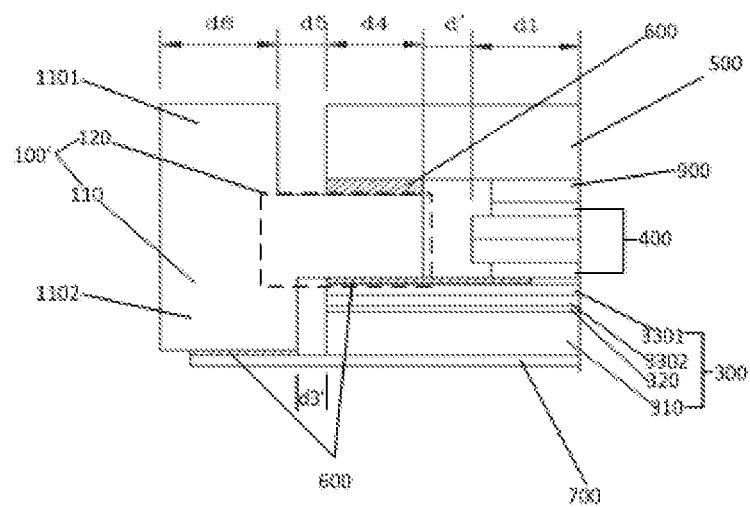
FIG. 2 is a structural schematic diagram of a display device comprising a support frame provided by an embodiment of the present disclosure.

In order to solve the problem that the width of the frame is relatively large, an embodiment of the present disclosure provides a support frame; as illustrated by FIG. 2, the support frame 100' comprises: a main body 110 and a protrusion 120 disposed at a side of the main body 110, the main body 110 comprises a first portion 1101 located on the protrusion 120 and a second portion 1102 located under the protrusion 120, the thickness of the first portion 1101 is at least equal to the thickness of a touch cover plate 500, and the main body 110 can be used to support an end portion of the touch cover plate 500. The thickness of second portion 1102 is at least equal to the thickness of the backlight module 300, such that a portion of the support frame 100' under the protrusion 120 can accommodate an end portion of a backlight module 300. The thickness of the protrusion is at least equal to the thickness of the display panel 400, the thickness of the protrusion 120 (herein, the thickness of the protrusion 120 refers to a vertical distance between a lower surface of the first portion 1101 of the main body 110 and an upper surface of the second portion 1102 of the main body 110) is at least equal to the thickness of the display panel 400, such that a region inside the protrusion 120 of the support frame 100' can accommodate the display panel 400.

For example, the thickness of the main body 110 located under the protrusion 120 is larger than the thickness of the main body 110 located on the protrusion 120, i.e., the thickness of the second portion 1102 of the main body 110 is larger than the thickness of the first portion 1101.

For example, a distance between the touch cover plate 500 and the first portion 1101 of the main body 110 is a shortest would-be distance d5 between the touch cover plate 500 and the first portion 1101 of the main body 110.

For example, a distance between the backlight module 300 and the second portion 1102 of the main body 110 is a shortest would-be distance d3' between the backlight module 300 and the second portion 1102 of the main body 110.

For example, a width of the second portion is larger than a width of the first portion, such that the risk of breaking of the protrusion 120 upon being transferred can be reduced. It can be seen that d3' is smaller than d5.

For example, an end surface of the touch cover plate 500 is flush with an end surface of the backlight module 300.

Because a region under the protrusion 120 of the support frame 100' provided by the embodiments of the present disclosure can accommodate the backlight module 300, it is not necessary to dispose a rubber frame used to support the backlight module 300. In this way, the width of the frame of the corresponding display device can only be d1+d'+d4+d5+d6, wherein d' is a distance from the display panel 400 to an edge of the protrusion 120 of the support frame 100'. Because d' is smaller than d2+d3 in FIG. 1, the width of the frame can be reduced.

In an embodiment of the present disclosure, the thickness of the first portion 1101 of the main body 110 under the protrusion 120 is larger than the thickness of the second portion 1102 on the protrusion 120, such that the strength of the support frame 100' is stronger, so as to better support the weight which is needed to be supported.

In an embodiment of the present disclosure, an end portion of the backlight module 300 can be extended to a region under the protrusion 120, thus the thickness of the frame can be reduced, and the height of the protrusion 120 (a distance extending along a horizontal direction) can be set according to the practical application.

It can be understood that, in a practical application, generally the support frame 100' has an annular shape, correspondingly, the main body 110 and the protrusion 120 can respectively have an annular shape. For example, the annular shape is a rectangular ring.

An embodiment of the present disclosure further provides a display device, the structure of the display device can also refer to FIG. 2, besides the above-mentioned support frame 100', the display device further comprises: a backlight module 300, a display panel 400 and a touch cover plate 500; an end portion of the touch cover plate 500 is disposed on the protrusion 120 and opposite to the first portion 1101 of the main body 110, for example, an end surface of the touch cover plate 500 is opposite to a side surface of the first portion 1101; an end portion of the backlight module 300 is disposed under the protrusion 120 and opposite to the second portion 1102 of the main body 110, for example, an end surface of the backlight module 300 is opposite to a side surface of the second portion 1102; the display panel 400 is disposed at a side of the protrusion 120 away from the main body 110.

For example, the backlight module 300 can comprise a light guide plate 310 and a diffusion film 320 attached on the light guide plate 310, a first prism sheet 3301 and a second prism sheet 3302. In another embodiment, the above-mentioned light guide plate 310 can be attached with other optical film layers. Herein, the thickness of the second portion 1102 of the main body 110 is in accordance with a sum of the thickness of the light guide plate 310 and the thickness of the optical film layers attached on the light guide plate 310.

For example, the backlight module 300 can be bonded on a lower surface of the protrusion 120 of the support frame 100' through light shielding adhesive 600.

For example, the touch cover plate 500 is fixed on an upper surface of the protrusion 120 through light shielding adhesive 600.

For example, the thickness of the protrusion 120 is at least equal to the thickness of the display panel 400. For example, the thickness of the protrusion 120 is larger than the thickness of the display panel 400, and a sum of the thickness of the protrusion 120 and the thickness of the light shielding adhesive 600 is equal to a sum of the thickness of the display panel 400 and the thickness of the optical transparent adhesive 900. The optical transparent adhesive 900 is used to bond the touch cover plate 500 and the display panel 400.

For example, from the top to the bottom, the display panel 400 comprises an upper polarizing sheet, an upper substrate, a lower substrate and a lower polarizing sheet. Those skilled in the art can understand that, for the purpose of simplification, the conventional portions or layers in the display panel, such as a liquid crystal layer, are not shown in the drawings.

For example, referring to FIG. 2, the display device can further comprise a support plate 700, the support plate 700 is fixed on a lower surface of the main body 120 of the support frame 100', and the backlight module 300 is disposed on the support plate 700. In this way, the problem that the backlight module 300 falls off the support frame 100' can be avoided.

For example, an upper surface of the support plate 700 can be a reflective surface, such that the support plate 700 can also realize reflecting light, so as to avoid independently disposing a reflective layer under the light guide plate 310.

For example, the support plate 700 can be fixed on a lower surface of the main body 120 through a bonding method (for example, through the light shielding adhesive illustrated in FIG. 2); or, the support plate 700 can be fixed on a lower surface of the main body 120 through a screw 800. Certainly, in a practical application, other methods such as snap joint can be adopted to fix the support plate on the lower surface of the main body.

Figure 3:
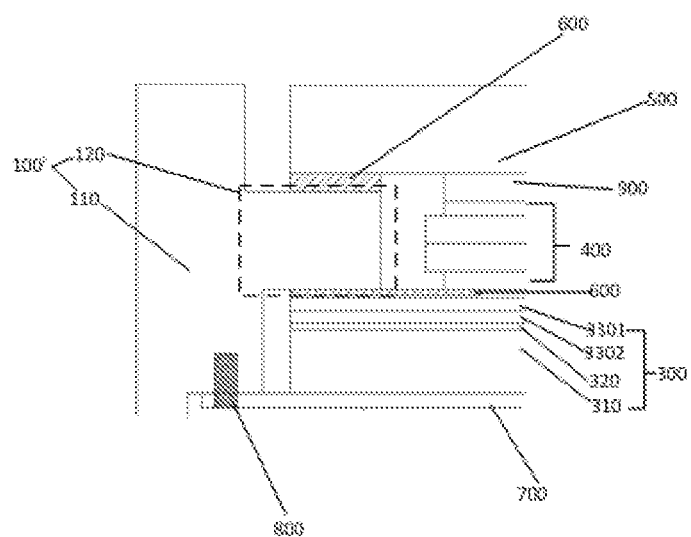
FIG. 3 is another structural schematic diagram of a display device comprising a support frame provided by an embodiment of the present disclosure.

Referring to FIG. 2 and FIG. 3, in the display device provided by an embodiment of the present disclosure, an end surface of the backlight module 300 can be flush with an end surface of the touch cover plate 500.

For example, the backlight module 300 and the display panel 400 can be connected together through optical transparent adhesive 900. Besides, the display panel 400 and the touch cover plate 500 can be connected together through optical transparent adhesive 900. In this way, the stability degree of the whole display device can be increased, and the decentralization of the structures in the display device can be avoided.

For example, the display device can be: an electronic paper, a cellphone, a tablet computer, a television, a display device, a notebook computer, a digital frame, a navigator, or any other product or component having display function.

Figure 4:
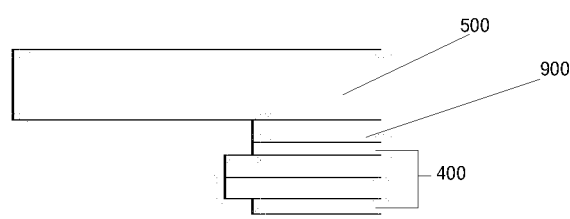
FIG. 4-FIG. 6 are schematic diagrams of a part of the steps in a mounting method of a display device provided by an embodiment of the present disclosure.
Figure 5:
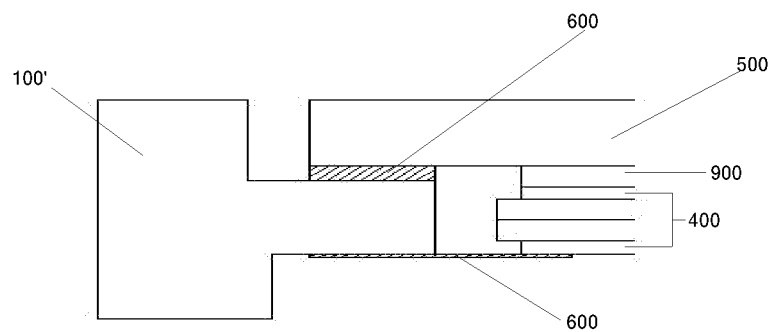
Figure 6:
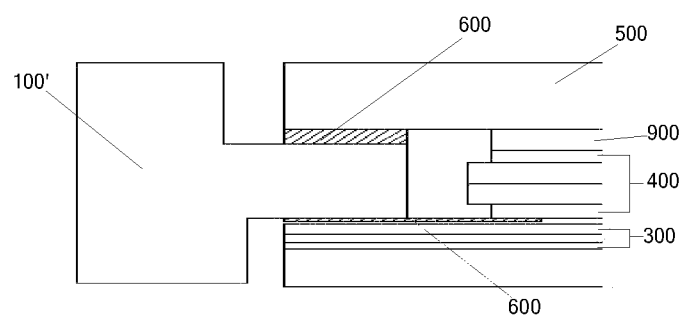

An embodiment of the present disclosure further provides a mounting method of a display device, which can be used for mounting the display device as shown in FIG. 2 or FIG. 3, referring to FIG. 4-FIG. 6, the method can comprise the following steps.

Step S1: providing a touch cover plate 500, a display panel 400, a backlight module 300 and a support frame 100'.

Step S2: referring to FIG. 4, connecting the touch cover plate 500 and the display panel 400 together, for example, through optical transparent adhesive 900, wherein an end portion of the touch cover plate 500 is extended outside a region corresponding to the display panel 400.

Step S3: referring to FIG. 5, fixing an end portion of the touch cover plate 500 on an upper surface of the protrusion 120 of the support frame 100' through light shielding adhesive 600.

Step S4: referring to FIG. 6, fixing an end portion of the backlight module 300 on a lower surface of the protrusion of the support frame 100' through light shielding adhesive 600.

After the step S4, the support plate 700 can be fixed on a lower surface of the main body 120 through light shielding adhesive 600, so as to obtain the display device illustrated by FIG. 2; the support plate can be fixed on the lower surface of the main body 120 through a screw 800, so as to obtain the display device illustrated by FIG. 3.

The above-mentioned method can be used to mount a display device with other structures, in step S3, the end portion of the touch cover plate 500 can be fixed on the upper surface of the protrusion 120 of the support frame 100' through other methods, in step S4, the end portion of the backlight module 300 can be fixed on the lower surface of the protrusion 120 of the supporting frame 100' through another method.

Apparently, one skilled in the art can devise variations or modifications to the present disclosure that within the scope and the spirit of the present disclosure, if those variations or modifications belong to the scope of the claims of the present disclosure and equivalent technology, the present disclosure intends to include these variations or modifications.

The foregoing are merely specific embodiments of the disclosure, but not limitative to the protection scope of the present disclosure. The protection scope of the disclosure should be defined by the accompanying claims.

The present disclosure claims the benefits of Chinese patent application No. 201610009042.0, which was filed on Jan. 6, 2016 and is incorporated in its entirety herein by reference as part of this application.

What is claimed is:
1. A display device, comprising:
a support frame, wherein the support frame comprises a main body and a protrusion disposed at a side of the main body, wherein the main body comprises a first portion located on the protrusion and a second portion located under the protrusion;
a touch cover plate, wherein an end portion of the touch cover plate is disposed on the protrusion and opposite to the first portion of the main body;
a backlight module, wherein an end portion of the backlight module is disposed under the protrusion and opposite to the second portion of the main body;
a support plate, wherein the support plate is fixed on a lower surface of the main body, and the backlight module is disposed on the support plate; and
a display panel disposed at a side of the protrusion away from the main body, wherein a thickness of the first portion is at least equal to a thickness of the touch cover plate, a thickness of the second portion is at least equal to a thickness of the backlight module, a region corresponding to the protrusion of the support frame accommodates the display panel, the touch cover plate is fixed on an upper surface of the protrusion through a first light shielding adhesive, the backlight module is fixed on a lower surface of the protrusion via a second light shielding adhesive, wherein the second light shielding adhesive is located at the lower surface of the protrusion and extends between the display panel and the backlight module and contacts with both of the display panel and the backlight module, and a surface of the support plate facing the backlight module is a reflective surface.

2. The display device according to claim 1, wherein the backlight module comprises a light guide plate and an optical film layer disposed on the light guide plate.

3. The display device according to claim 2, wherein the optical film layer comprises a first prism sheet, a second prism sheet, and a diffusion film.

4. The display device according to claim 2, wherein an end surface of the backlight module is flush with an end surface of the touch cover plate.

5. The display device according to claim 1, wherein the display panel and the touch cover plate are connected together via an optical transparent adhesive.

6. The display device according to claim 1, wherein the backlight module and the display panel are connected together via an optical transparent adhesive.

7. The display device according to claim 1, wherein the support plate is bonded to the lower surface of the main body.

8. The display device according to claim 7, wherein the support plate is bonded to the lower surface of the main body via a third light shielding adhesive.

9. The display device according to claim 1, wherein the support plate is fixed on the lower surface of the main body via a screw.

10. The display device according to claim 1, wherein an end surface of the backlight module is flush with an end surface of the touch cover plate.

11. The display device according to claim 1, wherein the thickness of the second portion is larger than that of the first portion.

12. The display device according to claim 1, wherein a width of the second portion is larger than that of the first portion.

13. A mounting method of a display device, comprising:
providing a touch cover plate, a display panel, a backlight module, and a support frame, wherein the support frame comprises a main body and a protrusion disposed at a side of the main body, the main body comprises a first portion located on the protrusion and a second portion located under the protrusion, a thickness of the first portion is at least equal to a thickness of the touch cover plate, a thickness of the second portion is at least equal to a thickness of the backlight module, and a region corresponding to the protrusion of the support frame accommodates the display panel;
connecting the touch cover plate and the display panel together;
fixing an end portion of the touch cover plate on an upper surface of the protrusion of the support frame via a first light shielding adhesive;
fixing an end portion of the backlight module on a lower surface of the protrusion of the support frame; and
fixing a support plate on a lower surface of the main body,
wherein the end portion of the touch cover plate is extended outside a region corresponding to the display panel;
the backlight module is fixed on a lower surface of the protrusion via a second light shielding adhesive, and the second light shielding adhesive located at the lower surface of the protrusion extends between the display panel and the backlight module and contacts with both of the display panel and the backlight module;
the backlight module is disposed on the support plate; and
a surface of the support plate facing the backlight module is a reflective surface.

14. The mounting method according to claim 13, wherein an end surface of the backlight module is flush with an end surface of the touch cover plate.

* * * * *